(12) United States Patent
Iguchi

(10) Patent No.: US 11,472,742 B2
(45) Date of Patent: Oct. 18, 2022

(54) DIELECTRIC COMPOSITION AND ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 156 days.

(21) Appl. No.: 17/115,100

(22) Filed: Dec. 8, 2020

(65) Prior Publication Data

US 2021/0179494 A1   Jun. 17, 2021

(30) Foreign Application Priority Data

Dec. 12, 2019   (JP) ............... JP2019-224821

(51) Int. Cl.
*C04B 35/03*   (2006.01)
*H01G 7/02*   (2006.01)

(52) U.S. Cl.
CPC ............. C04B 35/03 (2013.01); H01G 7/026 (2013.01); *C04B 2235/3208* (2013.01); *C04B 2235/3244* (2013.01); *C04B 2235/401* (2013.01); *C04B 2235/428* (2013.01); *C04B 2235/76* (2013.01)

(58) Field of Classification Search
CPC ............ C04B 35/03; C04B 2235/3208; C04B 2235/3244; C04B 2235/428; C04B 2235/76; C04B 2235/3232; C04B 2235/3262; C04B 2235/3418; C04B 35/465; C04B 35/48; C04B 35/488; C04B 35/49; H01G 7/026; H01G 4/30; H01G 4/1227; H01G 4/12236; H01G 4/1245

See application file for complete search history.

(56) References Cited

U.S. PATENT DOCUMENTS

| 6,487,065 B1 | 11/2002 | Nishino et al. |
| 2011/0038096 A1 | 2/2011 | Naito et al. |
| 2011/0212382 A1* | 9/2011 | Randall ............... C01G 49/009 |
| | | 264/618 |

FOREIGN PATENT DOCUMENTS

JP       2001-307940 A       11/2001

* cited by examiner

*Primary Examiner* — Karl E Group
*Assistant Examiner* — Cameron K Miller
(74) *Attorney, Agent, or Firm* — Oliff PLC

(57) ABSTRACT

A dielectric composition includes a main phase and a Ca—Si—P—O segregation phase. The main phase includes a main component expressed by $ABO_3$. "A" includes at least one selected from calcium and strontium. "B" includes at least one selected from zirconium, titanium, hafnium, and manganese. The Ca—Si—P—O segregation phase includes at least calcium, silicon, and phosphorus.

18 Claims, 2 Drawing Sheets

DIELECTRIC COMPOSITION AND ELECTRONIC COMPONENT

BACKGROUND OF THE INVENTION

The present invention relates to a dielectric composition and an electronic component including dielectric layers composed of the dielectric composition.

An electronic circuit or a power supply circuit incorporated into electronic equipment is provided with a large number of electronic components such as multilayer ceramic capacitors that utilize dielectric characteristics expressed by dielectric material. Patent Document 1 discloses a dielectric composition including a main crystal phase whose main components are $CaTiO_3$ and $CaZrO_3$ and a secondary phase whose main components are Ca and Si.

However, it has been found that the above-mentioned dielectric composition does not sufficiently restraint the generation of cracks in a hot and humid environment.

Patent Document 1: JP2002265261 (A)

BRIEF SUMMARY OF INVENTION

The present invention has been achieved under such circumstances. It is an object of the invention to provide a dielectric composition capable of exhibiting a high restraint effect on the generation of cracks in a hot and humid environment and an electronic component including a dielectric layer composed of the dielectric composition.

To achieve the above object, a dielectric composition according to the present invention includes a main phase and a Ca—Si—P—O segregation phase, wherein the main phase includes a main component expressed by $ABO_3$, "A" includes at least one selected from calcium and strontium, "B" includes at least one selected from zirconium, titanium, hafnium, and manganese, and the Ca—Si—P—O segregation phase includes at least calcium, silicon, and phosphorus.

In the dielectric composition according to the present invention, it is preferred that the Ca—Si—P—O segregation phase includes:

0.24-0.77 parts by mol of calcium;
0.00-0.40 parts by mol of strontium;
0.05-0.30 parts by mol of silicon; and
0.05-0.40 parts by mol of phosphorus, provided that a total of calcium, silicon, strontium, and phosphorus included in the Ca—Si—P—O segregation phase is 1 part by mol.

In the dielectric composition according to the present invention, it is preferred that the Ca—Si—P—O segregation phase has an orthorhombic crystal system.

The dielectric composition according to the present invention may further include a Ca—Zr—O based segregation phase.

In the dielectric composition according to the present invention, it is preferred that the Ca—Si—P—O segregation phase has a circle equivalent diameter of 0.02-1 μm.

In the dielectric composition according to the present invention, it is preferred that an area ratio of the Ca—Si—P—O segregation phase expressed by a formula of (an area of the Ca—Si—P—O segregation phase/an area of the main phase)×100 [%] is 0.5-10%.

An electronic component according to the present invention includes the dielectric composition according to the present invention.

DETAILED DESCRIPTION OF INVENTION

<1. Multilayer Ceramic Capacitor>

Figure 1:
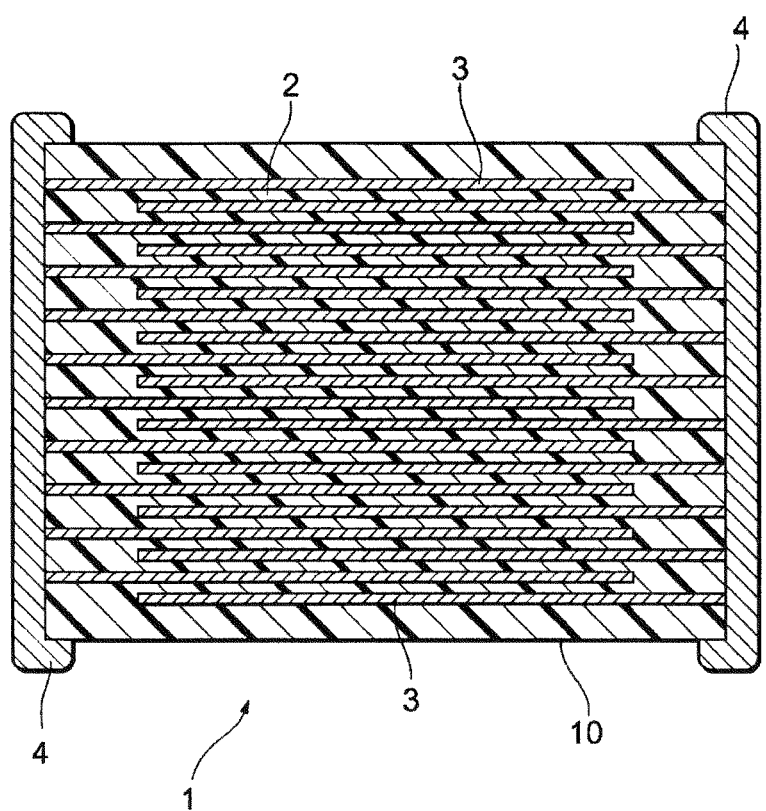
FIG. 1 is a cross-sectional view of a multilayer ceramic capacitor according to an embodiment of the present invention.

FIG. 1 shows a multilayer ceramic capacitor 1 as an electronic component according to the present embodiment. The multilayer ceramic capacitor 1 includes an element body 10 formed by alternately laminating dielectric layers 2 and internal electrode layers 3. A pair of external electrodes 4 is formed on both ends of the element body 10 and is conducted with the internal electrode layers 3 alternately arranged inside the element body 10. The element body 10 may have any shape, but normally has a rectangular parallelepiped shape. The size of the element body 10 is not limited and is appropriately determined based on usage.

1.1 Dielectric Layers

The dielectric layers 2 are composed of a dielectric composition according to the present embodiment mentioned below.

The thickness of the dielectric layers 2 per one layer (thickness between layers) is not limited and can be determined freely based on desired characteristics, usage, etc. The thickness between layers of the dielectric layers 2 is normally preferably 30 μm or less, more preferably 20 μm or less, and still more preferably 10 μm or less.

In the present embodiment, the dielectric composition includes Ca—Si—P—O segregation phases 16 mentioned below, and the generation of cracks is thereby restrained in a hot and humid environment even if the dielectric layers 2 are thin. In the present embodiment, the dielectric layers 2 can thereby be thinned to 2 μm.

The lamination number of dielectric layers 2 is not limited, but is preferably, for example, 20 or more in the present embodiment.

1.2 Internal Electrode Layers

In the present embodiment, the internal electrode layers 3 are laminated so that their ends are alternately exposed to the surfaces of two end surface of the element body 10 facing each other.

The internal electrode layers 3 contain any conductive material. The noble metal of the conductive material is Pd, Pt, Ag—Pd alloy, etc. The base metal of the conductive material is Ni, Ni based alloy, Cu, Cu based alloy, etc. Incidentally, about 0.1 mass % or less of various fine components, such as P and/or S, may be contained in Ni, Ni based alloy, Cu, or Cu based alloy. The internal electrode layers 3 may be formed using a commercially available electrode paste. The thickness of the internal electrode layers 3 is determined appropriately based on usage or so.

1.3 External Electrodes

The external electrodes 4 contain any conductive material. For example, the external electrodes 4 contain a known conductive material of Ni, Cu, Sn, Ag, Pd, Pt, Au, their alloy, conductive resin, or the like. The thickness of the external electrodes 4 is determined appropriately based on usage or so.

<2. Dielectric Composition>

Figure 2:
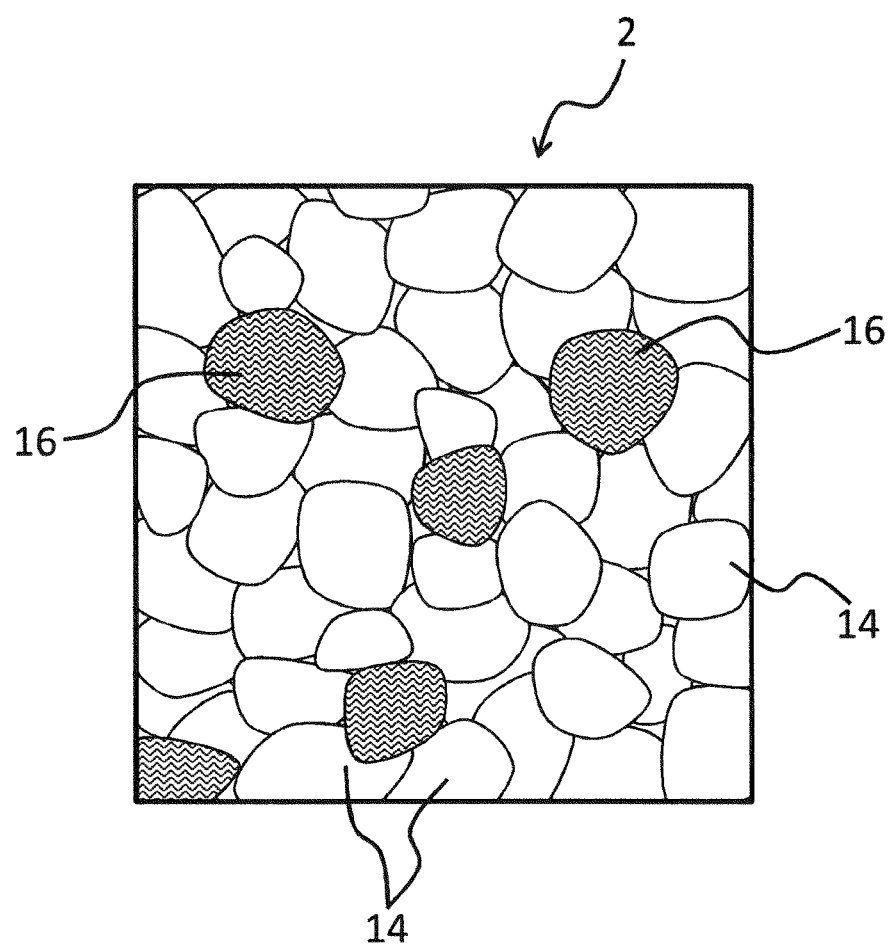
FIG. 2 is a schematic view of a cross section of a dielectric composition constituting dielectric layers shown in FIG. 1.

As shown in FIG. 2, the dielectric composition constituting the dielectric layers 2 according to the present embodiment includes Ca—Si—P—O segregation phases 16 among main phases 14.

2.1 Main Phases

The main phases 14 according to the present embodiment include a main component expressed by $ABO_3$. The main component is a component occupying 80-100 parts by mass to 100 parts by mass of the main phases and is preferably a component occupying 90-100 parts by mass to 100 parts by mass of the main phases.

The molar ratio of "A" to "B" expressed by (a molar ratio of "A"/a molar ratio of "B") may be one or may not be one. Preferably, the molar ratio of "A" to "B" is 0.9-1.2.

"A" includes at least one selected from calcium (Ca) and strontium (Sr). In the present embodiment, "A" is preferably calcium (Ca).

When a total of calcium (Ca) and strontium (Sr) included in "A" is 1 part by mol, "A" may include 0-0.5 parts by mol of strontium (Sr).

"B" includes at least one selected from zirconium (Zr), titanium (Ti), hafnium (Hf), and manganese (Mn). In the present embodiment, "B" is preferably zirconium (Zr).

When a total of zirconium (Zr), titanium (Ti), hafnium (Hf), and manganese (Mn) is 1 part by mol, "B" preferably includes 0-0.2 parts by mol (more preferably, 0-0.1 parts by mol) of titanium (Ti).

When a total of zirconium (Zr), titanium (Ti), hafnium (Hf), and manganese (Mn) is 1 part by mol, "B" preferably includes 0-0.05 parts by mol (more preferably, 0-0.02 parts by mol) of hafnium (Hf).

When a total of zirconium (Zr), titanium (Ti), hafnium (Hf), and manganese (Mn) is 1 part by mol, "B" preferably includes 0-0.05 parts by mol (more preferably, 0-0.03 parts by mol) of manganese (Mn).

In the present embodiment, if necessary, the main phases 14 may include elements of aluminum (Al), silicon (Si), vanadium (V), rare earth elements (RE), etc.

2.2 Ca—Si—P—O Segregation Phases

As shown in FIG. 2, the dielectric composition constituting the dielectric layers 2 according to the present embodiment includes Ca—Si—P—O segregation phases 16 among the above-mentioned main phases 14. The Ca—Si—P—O segregation phases 16 include at least calcium (Ca), silicon (Si), and phosphorus (P). This allows the dielectric composition according to the present embodiment to exhibit a high restraint effect on the generation of cracks in a hot and humid environment.

When a total of calcium (Ca), strontium (Sr), silicon (Si), and phosphorus (P) included in the Ca—Si—P—O segregation phases 16 is 1 part by mol, the Ca—Si—P—O segregation phases 16 preferably include 0.24-0.77 parts by mol (more preferably, 0.34-0.66 parts by mol) of calcium (Ca).

When a total of calcium (Ca), strontium (Sr), silicon (Si), and phosphorus (P) included in the Ca—Si—P—O segregation phases 16 is 1 part by mol, the Ca—Si—P—O segregation phases 16 preferably include 0.00-0.40 parts by mol (more preferably, 0-0.3 parts by mol) of strontium (Sr).

When a total of calcium (Ca), strontium (Sr), silicon (Si), and phosphorus (P) included in the Ca—Si—P—O segregation phases 16 is 1 part by mol, the Ca—Si—P—O segregation phases 16 preferably include 0.05-0.30 parts by mol (more preferably, 0.07-0.25 parts by mol) of silicon (Si).

When a total of calcium (Ca), strontium (Sr), silicon (Si), and phosphorus (P) included in the Ca—Si—P—O segregation phases 16 is 1 part by mol, the Ca—Si—P—O segregation phases 16 preferably include 0.05-0.40 parts by mol (more preferably, 0.05-0.30 parts by mol) of phosphorus (P).

Incidentally, the Ca—Si—P—O segregation phases 16 may include elements other than the above-mentioned elements. For example, the Ca—Si—P—O segregation phases 16 may include zirconium (Zr), titanium (Ti), hafnium (Hf), manganese (Mn), magnesium (Mg), niobium (Nb), boron (B), etc.

Preferably, the specific compound constituting the Ca—Si—P—O segregation phases 16 is $(Ca, SO_5Si(PO_6)_2$. Incidentally, strontium (Sr) may not be included.

In the present embodiment, whether or not the dielectric composition constituting the dielectric layers 2 includes the Ca—Si—P—O segregation phases 16 is determined by any method and is determined by, for example, a specific method as below.

First of all, a cross section of the dielectric composition is photographed using scanning transmission electron microscope (STEM) to obtain a bright field (BF) image. The area of the filed to be photographed is not limited, but is about 1-10 µm square. In this bright field, a region whose contrast is different from that of the main phases 14 is determined to be a secondary phase. Whether or not there is a different contrast (i.e., whether or not there is a secondary phase) may be determined visually, with image processing software, or the like.

As for the above-mentioned secondary phase, each amount of calcium (Ca), silicon (Si), and phosphorus (P) is measured by EDS analysis.

When calcium (Ca), silicon (Si), and phosphorus (P) exist at the same location in a secondary phase, this secondary phase is determined to be the Ca—Si—P—O segregation phase 16.

In addition, the existence of the Ca—Si—P—O segregation phases 16 may be determined by mapping images. Specifically, a mapping image of calcium (Ca), a mapping image of silicon (Si), and a mapping image of phosphorus (P) are compared to each other, and a region where calcium (Ca), silicon (Si), and phosphorus (P) exist at the same location is determined to be the Ca—Si—P—O segregation phase 16.

In the present embodiment, a circle equivalent diameter of each of the Ca—Si—P—O segregation phases 16 is preferably 0.02-1 µm (more preferably, 0.05-0.5 µm). Incidentally, the circle equivalent diameter is a diameter of a circle whose area is equal to that of each of the Ca—Si—P—O segregation phases 16.

In the present embodiment, an area ratio of the Ca—Si—P—O segregation phases 16 is represented by a formula of "(Area of Ca—Si—P—O Segregation Phases/Area of Main Phases)×100 [%]".

In the present embodiment, the area ratio of the Ca—Si—P—O segregation phases 16 is preferably 0.5-10% (more preferably, 1-5%).

In the present embodiment, preferably, the Ca—Si—P—O segregation phases 16 have an orthorhombic crystal system.

In the present embodiment, the dielectric composition may include a Ca—Zr—O based segregation phase. The Ca—Zr—O based segregation phase is Ca stabilized zirconia. The Ca—Zr—O based segregation phase has a cubic crystal system.

As mentioned above, the main phases 14 of the dielectric composition according to the present embodiment includes a main component expressed by $ABO_3$, where "A" is at least one selected from calcium (Ca) and strontium (Sr), "B" is at least one selected from zirconium (Zr), titanium (Ti), hafnium (Hf), and manganese (Mn). Hereinafter, the composition system of the main phases 14 according to the present embodiment is represented by $(Ca, Sr)ZrO_3$.

Compared to when the composition system of the main phases 14 is $BaTiO_3$, when the composition system of the main phases 14 is $(Ca, Sr)ZrO_3$, the following advantages can be obtained: the change in capacitance is small at the time of voltage application; the change in capacitance is small at the time of temperature change; and the dielectric loss is small even if a high-frequency current flows. Thus, for example, the dielectric composition where the composition system of the main phases 14 is $(Ca, Sr)ZrO_3$ can favorably be utilized for resonant circuits.

The present inventor has found that when the dielectric composition where the composition system of the main phases 14 is $(Ca, Sr)ZrO_3$ includes the Ca—Si—P—O segregation phases 16, the deterioration of capacitor resistance is restrained in a hot and humid environment even if the dielectric layers 2 are thin. The reason is not necessarily clear, but it is conceivable that the progress of a mild crack generated in the dielectric composition stops at the time of reaching the Ca—Si—P—O segregation phases 16, which restrains the generation of cracks that are large enough to reduce the capacitor resistance.

Therefore, the present embodiment can reduce the thickness of the dielectric layers 2 to the above-mentioned one.

<3. Method of Manufacturing Multilayer Ceramic Capacitor>

Next, a method of manufacturing the multilayer ceramic capacitor 1 shown in FIG. 1 is explained below.

In the present embodiment, prepared are a calcined powder of $ABO_3$ particles (a main component of the main phases 14 constituting the above-mentioned dielectric composition), a calcined powder of a first additive agent, and a calcined powder of a second additive agent.

The calcined powder of the first additive agent is a calcined powder of calcium (Ca), strontium (Sr), silicon (Si), and phosphorus (P) constituting the Ca—Si—P—O segregation phases 16 after firing.

The calcined powder of the second additive agent is a calcined powder of calcium (Ca) and zirconium (Zr) to be included in a Ca—Zr—O segregation phase after firing.

Raw materials of the above-mentioned elements are not limited, and oxides of the above-mentioned elements can be used. It is also possible to use various compounds that can obtain oxides of the above-mentioned elements by firing. The various compounds of the elements excluding phosphorus (P) are carbonates, oxalates, nitrates, hydroxides, organometallic compounds, etc. In the present embodiment, the starting raw materials of the elements excluding phosphorus (P) are preferably powder. Phosphorus (P) can be added in various forms, such as phosphoric acid compounds.

Among the prepared starting raw materials, the raw material of the $ABO_3$ particles is weighed to a predetermined ratio and is thereafter mixed in wet manner for a predetermined time using a ball mill or so. The mixed powder is dried and thereafter heated at 700-1300° C. in the air to obtain a calcined powder of the $ABO_3$ particles. The calcined powder may be pulverized for a predetermined time using a ball mill or so.

Various compounds or so, such as oxides of calcium (Ca), strontium (Sr), and silicon (Si) constituting the Ca—Si—P—O segregation phases 16 after firing, and various compounds or so, such as phosphorus (P) acid based compound, are prepared and heated to obtain the calcined powder of the first additive agent.

The circle equivalent diameter of each of the Ca—Si—P—O segregation phases 16 can be changed by changing pulverization conditions of the calcined powder of the first additive agent. For example, the circle equivalent diameter of each of the Ca—Si—P—O segregation phases 16 can be adjusted by changing the pulverization time in a ball mill.

Various compounds or so, such as oxides of calcium (Ca) and zirconium (Zr) constituting the Ca—Zr—O based segregation phase after firing, are prepared and heated to obtain the calcined powder of the second additive agent.

Then, a paste for manufacturing green chips is prepared. The calcined powder of the $ABO_3$ particles, the calcined powder of the first additive agent, the calcined powder of the second additive agent, a binder, and a solvent are kneaded and turned into a paint to obtain a paste for dielectric layers. The binder and the solvent are known ones.

If necessary, the paste for dielectric layers may include additives, such as plasticizers and dispersants.

A paste for internal electrode layers is obtained by kneading the above-mentioned raw material of the conductive material, a binder, and a solvent. The binder and the solvent are known ones. If necessary, the paste for internal electrode layers may include additives, such as sintering inhibitors and plasticizers.

A paste for external electrodes can be prepared similarly to the paste for internal electrode layers.

Green sheets and internal electrode patterns are formed using the obtained pastes and are laminated to obtain green chips.

If necessary, the green chips are subjected to a binder removal treatment. As conditions of the binder removal treatment, for example, the holding temperature is preferably 200-350° C.

After the binder removal treatment, the green chips are fired to obtain the element body 10. In the present embodiment, the atmosphere of the firing is not limited and may be the air or a reduction atmosphere. In the present embodiment, the holding temperature of the firing is not limited and is, for example, 1200-1350° C.

After the firing, if necessary, the element body 10 is subjected to a reoxidation treatment (annealing). As conditions of the annealing, the oxygen partial pressure of the annealing is preferably higher than that of the firing, and the holding temperature is preferably 1150° C. or less.

A dielectric composition constituting the dielectric layers 2 of the element body 10 obtained in the above-mentioned manner is the above-mentioned dielectric composition. The end surfaces of the element body 10 are polished, applied with the paste for external electrodes, and fired to form the external electrodes 4. Then, if necessary, a coverage layer is formed on the surfaces of the external electrodes 4 by plating or so.

Accordingly, the multilayer ceramic capacitor 1 according to the present embodiment is manufactured.

MODIFIED EXAMPLES

In the above-mentioned embodiment, the electronic component according to the present invention is a multilayer ceramic capacitor. However, the electronic component according to the present invention is not limited to multilayer ceramic capacitors and may be any other electronic components including the above-mentioned dielectric composition.

For example, the electronic component according to the present invention may be a single-plate-type ceramic capacitor where the above-mentioned composition is provided with a pair of electrodes.

The dielectric composition may include no Ca—Zr—O based segregation phases.

Hereinbefore, an embodiment of the present invention is explained, but the present invention is not limited to the above-mentioned embodiment and may be modified to various embodiments within the scope of the present invention.

Examples

Hereinafter, the present invention is explained in further detail with examples and comparative examples, but is not limited to the following examples.

Experiment 1

In Sample No. 1-25, powders of calcium carbonate ($CaCO_3$), strontium carbonate ($SrCO_3$), zirconium oxide ($ZrO_2$), titanium oxide ($TiO_2$), hafnium oxide ($HfO_2$), and manganese carbonate ($MnCO_3$) were prepared as starting raw materials of main phases included in a dielectric composition. The prepared starting raw materials were weighed so that the composition of the main phases after firing would be those shown in Table 1.

Next, the weighed powders were mixed in wet manner for 16 hours in a ball mill using ion-exchanged water as dispersion medium, and this mixture was dried to obtain a mixed raw material powder. After that, the mixed raw material powder was heated at 900° C. (holding temperature) for two hours (holding time) in the air to obtain a calcined powder of a main component compound of the main phases.

In addition, powders of calcium carbonate ($CaCO_3$), strontium carbonate ($SrCO_3$), silicon oxide ($SiO_2$), and ammonium dihydrogen phosphate ($NH_4H_2PO_4$) were prepared as raw materials of a first additive agent. The prepared starting raw materials were weighed so that the molar ratio of each element constituting the first additive agent would be one shown in Table 1, and that the addition amount of the first additive agent would be 3 parts by mass.

Incidentally, the addition amount of the first additive agent was an addition amount of the first additive agent when the main component of the main phases was 100 parts by mass.

The powders of calcium carbonate ($CaCO_3$), strontium carbonate ($SrCO_3$), silicon oxide ($SiO_2$), and ammonium dihydrogen phosphate ($NH_4H_2PO_4$) were heated at 900° C. (holding temperature) for two hours (holding time) in the air to obtain a calcined powder of the first additive agent.

The calcined powder of the main component compound of the main phases and the calcined powder of the first additive agent were pulverized in wet manner for 16 hours in a ball mill using ion-exchanged water as dispersion medium and dried to obtain a dielectric raw material.

100 parts by mass of the dielectric raw material, 10 parts by mass of polyvinyl butyral resin, 5 parts by mass of dioctyl phthalate (DOP) as plasticizer, and 100 parts by mass of methyl ethyl ketone (MEK) as solvent were mixed in a ball mill and turned into a paste to obtain a paste for dielectric layers.

44.6 parts by mass of Ni particles, 52 parts by mass of terpineol, 3 parts by mass of ethyl cellulose, and 0.4 parts by mass of benzotriazole were kneaded by a triple roll and turned into a paste to obtain a paste for internal electrode layers.

Then, a green sheet was formed on a PET film using the above-manufactured paste for dielectric layers. Next, an internal electrode layer was printed in a predetermined pattern on the green sheet using the paste for internal electrode layers. After that, the sheet was peeled from the PET film to manufacture the green sheet with the internal electrode layer.

Next, a plurality of green sheets with the internal electrode layer was laminated and bonded with pressure to obtain a green laminated body. The green laminated body was cut into a predetermined size to obtain a green chip.

The green chip was subjected to a binder removal treatment, fired, and annealed with the following conditions to obtain an element body.

As the conditions of the binder removal treatment, the heating rate was 25° C./hour, the holding temperature was 260° C., the temperature holding time was eight hours, and the atmosphere was the air.

As the firing conditions, the heating rate was 200° C./hour, the holding temperature was 1200° C., and the holding time was two hours. The cooling rate was 200° C./hour. Incidentally, the atmosphere gas was a humidified $N_2+H_2$ mixed gas, and the oxygen partial pressure was $10^{-12}$ MPa.

As the annealing conditions, the heating rate was 200° C./hour, the holding temperature was 1000° C., the temperature holding time was two hours, the cooling rate was 200° C./hour, and the atmosphere gas was a humidified $N_2$ gas (oxygen partial pressure: $10^{-7}$ MPa).

Incidentally, a wetter was used for humidification of the atmosphere gases of the firing and the annealing.

Next, the surface of the capacitor element body was subjected to barrel polishing, applied with Cu as external electrodes, and fired in nitrogen gas to obtain a capacitor sample of a multilayer ceramic capacitor shown in FIG. 1. The size of the capacitor sample was 3.2 mm×1.6 mm×1.6 mm. The thickness of each of the dielectric layers was 2.5 μm. The thickness of each of the internal electrode layers was 1.1 μm. The number of dielectric layers sandwiched by the internal electrode layers was 200.

A secondary phase was determined by STEM in a visual field of 10 μm×10 μm on a cross section of the dielectric composition (dielectric layers) of the capacitor sample. Each amount of calcium (Ca), strontium (Sr), silicon (Si), and phosphorus (P) was measured with EDS to determine whether or not the secondary phase was a Ca—Si—P—O segregation phase.

In the capacitor samples of Table 1, the molar ratio of the first additive agent of calcium (Ca), strontium (Sr), silicon (Si), and phosphorus (P) and the average molar ratio of the Ca—Si—P—O segregation phases corresponded with each other.

The Ca—Si—P—O segregation phases included in the dielectric composition (dielectric layers) were subjected to electron beam diffraction, and an electron beam pattern was analyzed to determine the crystal system. The results are shown in Table 1.

A first PCBT test was carried out as below. The capacitor samples were mounted on a FR-4 substrate (glass epoxy substrate) by Sn—Ag—Cu solder, put into a pressure cooker tank, and subjected to an accelerated moisture resistance load test where voltage (50V) was applied for 100 hours in an atmosphere of 121° C. and humidity 95%. This test was carried out for 500 capacitor samples. The number of failures for each of the capacitor samples is shown in Table 1.

TABLE 1

| Sample No. | Main Component of Main Phase (ABO$_3$ *1) ||| First Additive Agent *2 |||| Ca—Si—P—O Segregation Phase || First PCBT Test |
| | A-site Molar Ratio of Sr/ (Ca + Sr) | B-site Molar Ratio of Each Element to Total (1 mol) of (Zr + Ti + Hf + Mn) ||| Molar Ratio of Each Element to Total (1 mol) of Ca, Sr, Si, and P Included in First Additive Agent |||| Existence | Crystal Structure | |
| | | Ti | Hf | Mn | Ca | Sr | Si | P | | | |
|---|---|---|---|---|---|---|---|---|---|---|---|
| 1 | 0.3 | 0.04 | 0.01 | 0.02 | | | | | no | orthorhombic | 12 |
| 2 | 0.3 | 0.04 | 0.01 | 0.02 | 0.56 | 0.21 | 0.15 | 0.08 | yes | orthorhombic | 0 |
| 3 | 0.3 | 0.04 | 0.01 | 0.02 | 0.76 | 0.11 | 0.07 | 0.06 | yes | orthorhombic | 0 |
| 4 | 0.3 | 0.04 | 0.01 | 0.02 | 0.63 | 0.00 | 0.13 | 0.24 | yes | orthorhombic | 0 |
| 5 | 0.3 | 0.008 | 0.003 | 0.002 | 0.44 | 0.19 | 0.13 | 0.24 | yes | orthorhombic | 0 |
| 6 | 0.3 | 0.008 | 0.003 | 0.002 | 0.56 | 0.21 | 0.15 | 0.08 | yes | orthorhombic | 0 |
| 7 | 0.3 | 0.008 | 0.003 | 0.002 | 0.76 | 0.11 | 0.07 | 0.06 | yes | orthorhombic | 0 |
| 8 | 0 | 0.04 | 0.01 | 0.02 | 0.56 | 0.21 | 0.15 | 0.08 | yes | orthorhombic | 0 |
| 9 | 0.3 | 0 | 0.01 | 0.02 | 0.56 | 0.21 | 0.15 | 0.08 | yes | orthorhombic | 0 |
| 10 | 0.3 | 0.04 | 0 | 0.02 | 0.56 | 0.21 | 0.15 | 0.08 | yes | orthorhombic | 0 |
| 11 | 0.3 | 0.04 | 0.01 | 0 | 0.56 | 0.21 | 0.15 | 0.08 | yes | orthorhombic | 0 |
| 12 | 0.5 | 0.04 | 0.01 | 0.02 | 0.56 | 0.21 | 0.15 | 0.08 | yes | orthorhombic | 0 |
| 13 | 0.3 | 0.2 | 0.01 | 0.02 | 0.56 | 0.21 | 0.15 | 0.08 | yes | orthorhombic | 0 |
| 14 | 0.3 | 0.04 | 0.05 | 0.02 | 0.56 | 0.21 | 0.15 | 0.08 | yes | orthorhombic | 0 |
| 15 | 0.3 | 0.04 | 0.01 | 0.05 | 0.56 | 0.21 | 0.15 | 0.08 | yes | orthorhombic | 0 |
| 16 | 0.3 | 0.04 | 0.01 | 0.02 | 0.77 | 0.00 | 0.15 | 0.08 | yes | orthorhombic | 0 |
| 17 | 0.3 | 0.04 | 0.01 | 0.02 | 0.47 | 0.30 | 0.15 | 0.08 | yes | orthorhombic | 0 |
| 18 | 0.3 | 0.04 | 0.01 | 0.02 | 0.37 | 0.40 | 0.15 | 0.08 | yes | orthorhombic | 0 |
| 19 | 0.3 | 0.04 | 0.01 | 0.02 | 0.66 | 0.21 | 0.05 | 0.08 | yes | orthorhombic | 0 |
| 20 | 0.3 | 0.04 | 0.01 | 0.02 | 0.51 | 0.21 | 0.20 | 0.08 | yes | orthorhombic | 0 |
| 21 | 0.3 | 0.04 | 0.01 | 0.02 | 0.41 | 0.21 | 0.30 | 0.08 | yes | orthorhombic | 0 |
| 22 | 0.3 | 0.04 | 0.01 | 0.02 | 0.59 | 0.21 | 0.15 | 0.05 | yes | orthorhombic | 0 |
| 23 | 0.3 | 0.04 | 0.01 | 0.02 | 0.34 | 0.21 | 0.15 | 0.30 | yes | orthorhombic | 0 |
| 24 | 0.3 | 0.04 | 0.01 | 0.02 | 0.24 | 0.21 | 0.15 | 0.40 | yes | orthorhombic | 0 |
| 25 | 0.3 | 0.04 | 0.01 | 0.02 | 0.64 | 0.21 | 0.15 | 0.00 | no | orthorhombic | 14 |
| 26 | 0.3 | 0.04 | 0.01 | 0.02 | 0.67 | 0.00 | 0.33 | 0.00 | no | orthorhombic | 17 |

*1 . . . (Molar Ratio of A/Molar Ratio of B) = 1
*2 . . . Additive Amount of First Additive Agent: 3 parts by mass (Main Component of Main Phase: 100 parts by mass)

According to Table 1, compared to when there were no Ca—Si—P—O segregation phases (Sample No. 1, 25, and 26), when there was the Ca—Si—P—O segregation phase (Sample No. 2-24), the number of failures at the first PCBT test was small, and the generation of cracks in a hot and humid environment was highly restrained.

Experiment 2

Capacitor samples were obtained similarly to Experiment 1, except that the powders were pulverized in a ball mill using a dispersant and dried to obtain the dielectric raw materials in Sample No. 31 by adding a calcined powder of a second additive agent in addition to the calcined powder of the main component compound of the main phases and the calcined powder of the first additive agent. Incidentally, the second additive agent was a component that would be a Ca—Zr—O segregation phase after firing.

Incidentally, powders of calcium carbonate (CaCO$_3$) and zirconium oxide (ZrO$_2$) were prepared as raw materials of the second additive agent. In the second additive agent, the molar ratio of Ca element to Zr element was Ca:Zr=0.15:0.85. The addition amount of the second additive agent was 1 part by mass.

In Sample No. 31, the existence of Ca—Si—P—O segregation phases was determined similarly to Experiment 1.

In Sample No. 31, the existence of Ca—Zr—O segregation phases was determined in the following manner. In a visual field of 10 μm×10 μm on a cross section of the dielectric composition (dielectric layers) of the capacitor samples, a secondary phase was determined by STEM, and the secondary phase including calcium (Ca) and zirconium (Zr) at the same location and not being a Ca—Si—P—O segregation phase was determined to be a Ca—Zr—O segregation phase. In Sample No. 31, the existence of the Ca—Zr—O segregation phases was found.

In Sample No. 31, a first PCBT test was carried out similarly to Experiment 1. The results are shown in Table 2.

TABLE 2

| Sample No. | Main Component of Main Phase (ABO$_3$ *1) ||| First Additive Agent *2 |||| Ca—Si—P—O Segregation Phase || Ca—Zr—O Segregation Phase || First PCBT Test |
| | A-site Molar Ratio of Sr/ (Ca + Sr) | B-site Molar Ratio of Each Element to Total (1 mol) of (Zr + Ti + Hf + Mn) ||| Molar Ratio of Each Element to Total (1 mol) of Ca, Sr, Si, and P Included in First Additive Agent |||| Existence | Crystal Structure | Existence | Crystal Structure | |
| | | Ti | Hf | Mn | Ca | Sr | Si | P | | | | | |
|---|---|---|---|---|---|---|---|---|---|---|---|---|---|
| 2 | 0.3 | 0.04 | 0.01 | 0.02 | 0.56 | 0.21 | 0.15 | 0.08 | yes | orthorhombic | no | | 0 |
| 31 | 0.3 | 0.04 | 0.01 | 0.02 | 0.56 | 0.21 | 0.15 | 0.08 | yes | orthorhombic | yes | cubic | 0 |

*1 . . . (Molar Ratio of A/Molar Ratio of B) = 1
*2 . . . Additive Amount of First Additive Agent: 3 parts by mass (Main Component of Main Phase: 100 parts by mass)

According to Table 2, when there was a Ca—Zr—O segregation phase in addition to a Ca—Si—P—O segregation phase (Sample No. 31), the number of failures at the first PCBT test was also small, and the generation of cracks in a hot and humid environment was also highly restrained.

Experiment 3

Capacitor samples of Sample No. 41-44 were obtained similarly to Experiment 1, except that the circle equivalent diameter was adjusted by changing the pulverization time of the calcined powder of the first additive agent in a ball mill.

In Sample No. 41-44, the existence of Ca—Si—P—O segregation phases was determined similarly to Experiment 1. The results are shown in Table 3.

In Sample No. 2 and 41-44, an average circle equivalent diameter of the Ca—Si—P—O segregation phases in 10 square visual fields of 10 μm×10 μm was obtained.

In Sample No. 41-44, a first PCBT test was carried out similarly to Experiment 1. The results are shown in Table 3.

A second PCBT test was carried out as below. The capacitor samples were mounted on a FR-4 substrate (glass epoxy substrate) by Sn—Ag—Cu solder, put into a pressure cooker tank, and subjected to an accelerated moisture resistance load test where voltage (50V) was applied for 500 hours in an atmosphere of 121° C. and humidity 95%. This test was carried out for 100 capacitor samples. The number of failures for each of the capacitor samples is shown in Table 3.

TABLE 3

| Sample No. | Main Component of Main Phase ($ABO_3$ *1) | | | | First Additive Agent *2 Molar Ratio of Each | | | | Ca—Si—P—O Segregation Phase | | | First PCBT Test | Second PCBT Test |
|---|---|---|---|---|---|---|---|---|---|---|---|---|---|
| | A-site Molar Ratio of Sr/ (Ca + Sr) | B-site Molar Ratio of Each Element to Total (1 mol) of (Zr + Ti + Hf + Mn) | | | Element to Total (1 mol) of Ca, Sr, Si, and P Included in First Additive Agent | | | | Existence | Crystal Structure | Circle Equivalent Diameter [μm] | | |
| | | Ti | Hf | Mn | Ca | Sr | Si | P | | | | | |
| 41 | 0.3 | 0.04 | 0.01 | 0.02 | 0.56 | 0.21 | 0.15 | 0.08 | yes | orthorhombic | 0.02 | 0 | 2 |
| 42 | 0.3 | 0.04 | 0.01 | 0.02 | 0.56 | 0.21 | 0.15 | 0.08 | yes | orthorhombic | 0.05 | 0 | 0 |
| 2 | 0.3 | 0.04 | 0.01 | 0.02 | 0.56 | 0.21 | 0.15 | 0.08 | yes | orthorhombic | 0.2 | 0 | 0 |
| 43 | 0.3 | 0.04 | 0.01 | 0.02 | 0.56 | 0.21 | 0.15 | 0.08 | yes | orthorhombic | 0.5 | 0 | 0 |
| 44 | 0.3 | 0.04 | 0.01 | 0.02 | 0.56 | 0.21 | 0.15 | 0.08 | yes | orthorhombic | 1 | 0 | 1 |

*1 . . . (Molar Ratio of A/Molar Ratio of B) = 1

*2 . . . Additive Amount of First Additive Agent: 3 parts by mass (Main Component of Main Phase: 100 parts by mass)

According to Table 3, compared to when the circle equivalent diameter of the Ca—Si—P—O segregation phase was 0.02 μm (Sample No. 41) and to when the circle equivalent diameter of the Ca—Si—P—O segregation phase was 1 μm (Sample No. 44), when the circle equivalent diameter of the Ca—Si—P—O segregation phase was larger than 0.02 μm and smaller than 1 μm (Sample No. 42, 2, and 43), the number of failures at the second PCBT test was small, and the generation of cracks in a hot and humid environment was more highly restrained.

Experiment 4

Capacitor samples of Sample No. 51-54 were obtained similarly to Experiment 1 except for changing the addition amount of the first additive agent.

In Sample No. 51-54, the existence of Ca—Si—P—O segregation phases was determined similarly to Experiment 1.

In Sample No. 2 and 51-54, an average area ratio of the Ca—Si—P—O segregation phases in 10 square visual fields (10 μm×10 μm) was obtained.

In Sample No. 51-54, a first PCBT test was carried out similarly to Experiment 1. The results are shown in Table 4.

In Sample No. 51-54, a second PCBT test was carried out similarly to Experiment 3. The results are shown in Table 4.

TABLE 4

| | Main Component of Main Phase ($ABO_3$ *1) | | | | First Additive Agent | | | | | Ca—Si—P—O | | | |
|---|---|---|---|---|---|---|---|---|---|---|---|---|---|
| | A-site | B-site | | | First Additive Agent | | | | | Ca—Si—P—O | | | |
| | Molar | Molar Ratio of Each | | | Molar Ratio of Each Element to | | | | Additive | Segregation Phase | | | |
| Sample No. | Ratio of Sr/ (Ca + Sr) | Element to Total (1 mol) of (Zr + Ti + Hf + Mn) | | | Total (1 mol) of Ca, Sr, Si, and P Included in First Additive Agent | | | | Amount *3 [parts by mass] | Existence | Crystal Structure | Area Ratio [%] | First PCBT Test | Second PCBT Test |
| | | Ti | Hf | Mn | Ca | Sr | Si | P | | | | | | |
| 51 | 0.3 | 0.04 | 0.01 | 0.02 | 0.56 | 0.21 | 0.15 | 0.08 | 0.75 | yes | ortho-rhombic | 0.5 | 0 | 3 |
| 52 | 0.3 | 0.04 | 0.01 | 0.02 | 0.56 | 0.21 | 0.15 | 0.08 | 1.5 | yes | ortho-rhombic | 1 | 0 | 0 |
| 2 | 0.3 | 0.04 | 0.01 | 0.02 | 0.56 | 0.21 | 0.15 | 0.08 | 3.0 | yes | ortho-rhombic | 2 | 0 | 0 |
| 53 | 0.3 | 0.04 | 0.01 | 0.02 | 0.56 | 0.21 | 0.15 | 0.08 | 7.5 | yes | ortho-rhombic | 5 | 0 | 0 |
| 54 | 0.3 | 0.04 | 0.01 | 0.02 | 0.56 | 0.21 | 0.15 | 0.08 | 15.0 | yes | ortho-rhombic | 10 | 0 | 4 |

*1 . . . (Molar Ratio of A/Molar Ratio of B) = 1
*3 . . . Additive Amount of First Additive Agent (Main Component of Main Phase: 100 parts by mass)

According to Table 4, compared to when the area ratio of the Ca—Si—P—O segregation phases was 0.5 (Sample No. 51) and to when the area ratio of the Ca—Si—P—O segregation phases was 10 (Sample No. 54), when the area ratio of the Ca—Si—P—O segregation phases was larger than 0.5 and smaller than 10 (Sample No. 52, 2, and 53), the number of failures at the second PCBT test was small, and the generation of cracks in a hot and humid environment was more highly restrained.

DESCRIPTION OF THE REFERENCE NUMERICAL

1 . . . multilayer ceramic capacitor
10 . . . element body
2 . . . dielectric layer
14 . . . main phase
16 . . . Ca—Si—P—O segregation phase
3 . . . internal electrode layer
4 . . . external electrode

What is claimed is:

1. A dielectric composition comprising a main phase and a Ca—Si—P—O segregation phase, wherein
the main phase includes a main component expressed by $ABO_3$,
"A" includes at least one selected from calcium and strontium,
"B" includes at least one selected from zirconium, titanium, hafnium, and manganese, and
the Ca—Si—P—O segregation phase includes at least calcium, silicon, and phosphorus.

2. The dielectric composition according to claim 1, wherein the Ca—Si—P—O segregation phase includes:
0.24-0.77 parts by mol of calcium;
0.00-0.40 parts by mol of strontium;
0.05-0.30 parts by mol of silicon; and
0.05-0.40 parts by mol of phosphorus,
provided that a total of calcium, silicon, strontium, and phosphorus included in the Ca—Si—P—O segregation phase is 1 part by mol.

3. The dielectric composition according to claim 1, wherein the Ca—Si—P—O segregation phase has an orthorhombic crystal system.

4. The dielectric composition according to claim 2, wherein the Ca—Si—P—O segregation phase has an orthorhombic crystal system.

5. The dielectric composition according to claim 1, further comprising a Ca—Zr—O based segregation phase.

6. The dielectric composition according to claim 2, further comprising a Ca—Zr—O based segregation phase.

7. The dielectric composition according to claim 3, further comprising a Ca—Zr—O based segregation phase.

8. The dielectric composition according to claim 4, further comprising a Ca—Zr—O based segregation phase.

9. The dielectric composition according to claim 1, wherein the Ca—Si—P—O segregation phase has a circle equivalent diameter of 0.02-1 μm.

10. The dielectric composition according to claim 2, wherein the Ca—Si—P—O segregation phase has a circle equivalent diameter of 0.02-1 μm.

11. The dielectric composition according to claim 3, wherein the Ca—Si—P—O segregation phase has a circle equivalent diameter of 0.02-1 μm.

12. The dielectric composition according to claim 5, wherein the Ca—Si—P—O segregation phase has a circle equivalent diameter of 0.02-1 μm.

13. The dielectric composition according to claim 1, wherein an area ratio of the Ca—Si—P—O segregation phase expressed by a formula of (an area of the Ca—Si—P—O segregation phase/an area of the main phase)×100 [%] is 0.5-10%.

14. The dielectric composition according to claim 2, wherein an area ratio of the Ca—Si—P—O segregation phase expressed by a formula of (an area of the Ca—Si—P—O segregation phase/an area of the main phase)×100 [%] is 0.5-10%.

15. The dielectric composition according to claim 3, wherein an area ratio of the Ca—Si—P—O segregation phase expressed by a formula of (an area of the Ca—Si—P—O segregation phase/an area of the main phase)×100 [%] is 0.5-10%.

16. The dielectric composition according to claim 5, wherein an area ratio of the Ca—Si—P—O segregation phase expressed by a formula of (an area of the Ca—Si—P—O segregation phase/an area of the main phase)×100 [%] is 0.5-10%.

17. The dielectric composition according to claim 9, wherein an area ratio of the Ca—Si—P—O segregation phase expressed by a formula of (an area of the Ca—Si—P—O segregation phase/an area of the main phase)×100 [%] is 0.5-10%.

18. An electronic component comprising the dielectric composition according to claim 1.

* * * * *